United States Patent [19]

Hodorowski

[11] Patent Number: 5,796,603
[45] Date of Patent: Aug. 18, 1998

[54] PARTITIONING PROGRAM FOR HIGHLY DISTRIBUTED CONTROL SYSTEM TO REDUCE NETWORK TRAFFIC

[75] Inventor: John Hodorowski, Monroeville, Pa.

[73] Assignee: Allen Bradley Company, Inc., Milwaukee, Wis.

[21] Appl. No.: 733,378

[22] Filed: Oct. 17, 1996

[51] Int. Cl.$^6$ .............. G05B 15/00; G05B 19/18
[52] U.S. Cl. .............. 364/131; 364/133; 364/138; 364/146; 364/191
[58] Field of Search .............. 364/131, 133, 364/138, 146, 147, 191, 192; 395/82, 83, 670, 650, 600, 376, 395

[56] References Cited

U.S. PATENT DOCUMENTS

| | | | |
|---|---|---|---|
| 4,162,536 | 7/1979 | Morley | 364/900 |
| 4,172,289 | 10/1979 | Struger et al. | 364/900 |
| 4,742,443 | 5/1988 | Rohn et al. | 364/136 |
| 4,858,101 | 8/1989 | Stewart et al. | 364/131 |
| 4,876,664 | 10/1989 | Bittorf et al. | 364/900 |
| 4,937,777 | 6/1990 | Flood et al. | 364/900 |
| 4,972,365 | 11/1990 | Dodds et al. | 364/900 |
| 5,005,152 | 4/1991 | Knutsen | 364/900 |
| 5,157,701 | 10/1992 | Parker | 377/39 |
| 5,212,631 | 5/1993 | Schmidt et al. | 364/136 |
| 5,243,232 | 9/1993 | Bolda et al. | 307/296.4 |
| 5,245,331 | 9/1993 | Gibgons | 340/825.52 |
| 5,265,005 | 11/1993 | Schmidt et al. | 364/147 |
| 5,452,201 | 9/1995 | Pieronek et al. | 364/188 |
| 5,530,643 | 6/1996 | Hodorowski | 364/191 |

*Primary Examiner*—Paul P. Gordon
*Assistant Examiner*—Ramesh Patel
*Attorney, Agent, or Firm*—Keith M. Baxter; John M. Miller; John J. Horn

[57] ABSTRACT

A program for partitioning a centrally developed industrial control program into component that may be download to distributed devices for execution and control of an industrial process divides elements of the control program into spatially linked elements which are associated with physical devices that have defined locations and spatially independent elements that have no defined location within the control structure. The spatially linked elements are grouped together according to their proximity and the spatially independent elements are assigned to those groupings so as to minimize communications between the various links. The cost of the grouping, the band width of the signals and the capabilities of the modules are also considered.

11 Claims, 7 Drawing Sheets

| PROGRAM ELEMENT | OTHER ELEMENTS IN CONTROL MODULE | MOD CAT# | COST | INSTAL. |
|---|---|---|---|---|
| PB | — | — | 1 | 1 |
| PB | LT | — | 2 | 1 |
| PB | PB | — | 2 | 1 |
| PB | PB, LT, LT | — | 2.5 | 1 |
| PRS | — | — | 3 | 1 |
| SOL | X, X, X | — | 2 | 5 |

FIG. 11

| PROGRAM ELEMENT | EMULATING CODE | ICON | TERM. | CLASS | DEM. | DEVICE CAT.# | EXTERN. CONN. |
|---|---|---|---|---|---|---|---|
| PB 102 | ADDR. 1 | XX | 1.1 | A | 10 | XXX | YES |
| LT 105 | ADDR. 2 | XX | 1.1 | A | 10 | XXX | YES |
| FLT 102 | ADDR. 3 | XX | 1.1 | B | 110 | XXX | NO |
| PRS 109 | ADDR. 4 | XX | 1.1 | C | 10 | XXX | YES |

FIG. 12

| CONTROL MODULE ADDRESS | CLASS | MODULE CAT.# | CAPAC. |
|---|---|---|---|
| 7 | A | XXX | 100 |
| 17 | B | XXX | 150 |
| 29 | A | XXX | 200 |

PARTITIONING PROGRAM FOR HIGHLY DISTRIBUTED CONTROL SYSTEM TO REDUCE NETWORK TRAFFIC

FIELD OF THE INVENTION

This invention relates to industrial control systems, including programmable controllers, and more particularly, to a highly distributed industrial control system in which the control program is broken up and executed in many separate controllers and a method for programming the same.

BACKGROUND OF THE INVENTION

Industrial controllers such as those described in U.S. Pat. Nos. 3,810,118; 3,942,158; 4,165,534; and 4,442,504 are typically centralized, high-speed computers that may be connected to industrial equipment, such as automated assembly lines or machine tools, to operate such equipment in accordance with a stored control program. The stored program includes instructions, which when executed, examine the condition of selected inputs to the controller from sensing devices on the controlled equipment, and energize or de-energize selected outputs or actuators from the controller to operate devices on the controlled equipment.

Inputs to the industrial controller may be discrete binary signals, such as those from switches, which may detect limits of process variables such as motion, temperature, time, or other quantities, or the inputs may be analog measures of process variables which are generally then converted to digital words for processing, or the inputs may be multi-variable information.

Similarly, the outputs of the industrial controller may be either discrete binary signals as produced, typically, by mechanical or solid state relays; analog outputs produced by means of a digital to analog converter; or multi-variable commands.

Some of the inputs and outputs to the industrial controller may be remotely located and communicated to the controller by means of a digital communications link. Typically, the digital communications link connects the controller with a remote "I/O rack" (input/output rack) at which a number of inputs and outputs are clustered.

Present industrial controllers are often programmed by means of a "ladder logic" language in which the control program is represented as ladders whose vertical rails represent a power source or power return and whose rungs are series and parallel connected contacts and relay coils. The contacts may be either normally-open or normally-closed as controlled either by external inputs or by relay coils. This language reflects an implementation of the control program in discrete electrical devices (relays) as was practiced prior to industrial controllers.

The centralized architecture of current industrial control systems, in which a single central controller is used to read and control many remote control points, reflects both the historically high cost of computer hardware (as may be reduced by the use of a single centralized controller) and the desire for centralized reporting and coordination of the operation of an entire industrial process. Nevertheless, a centralized controller architecture is not ideal for all control tasks.

For some simple control tasks, with few inputs and outputs, the centralized controller may be unnecessarily complex and expensive, providing unneeded features and capacity. Conversely, for some complex control tasks, with many inputs and outputs, the speed limitations of the centralized controller may significantly degrade the performance of the control system.

The centralized controller typically processes each input and output of the control system, sequentially. For large programs, a significant delay may occur between the changing of an input and the control of a corresponding output. If the delay is large enough, the control system may become sluggish or unpredictable. With a centralized controller, the state of each remote input and output must also be repeatedly transmitted over the link to the centralized controller. When there are many remote inputs and outputs to the control system, the capacity of the link between the I/O and the centralized controller may become overloaded.

Finally, failure of the centralized controller typically disables the entire control system. Troubleshooting the cause of the controller failure may be difficult because often the failed controller cannot report information about its internal operation or execute troubleshooting programs.

One technique for eliminating some of these shortcomings of a centralized controller architecture is to divide the control process up to be executed by many separate control modules each of which may be located near each of the different control points on the machine or process. In this way, input and output signals are only communicated to a local control module and do not tax the capacity of the link connecting the control modules together. Because the many control modules may perform their control tasks in parallel, an effective speed gain is also realized. This approach, where there are many separate control modules acting in concert, is termed: "highly distributed control".

Ideally in a highly distributed control system, a single control program is written for the entire system and then broken apart so that portions can be transmitted (downloaded) to each of the control modules. Together with the control program, the control modules receive instructions as to how to communicate among each other to synchronize the control process.

Dividing a single control program among various distributed control modules and providing the control modules with the necessary instructions to synchronize their operation, can be a difficult and time consuming process. Normally there will be a number of ways that a control program can be divided. Choosing the correct division is important to ensure optimal performance of the control system.

SUMMARY OF THE INVENTION

The present invention provides a partitioning program, typically operating on the same computer used to develop the control program for dividing the control program among many control modules on an automatic or semiautomatic basis.

Generally the program works by identifying each element of the control program as being either "spatially linked" or "spatially independent". Spatially linked elements are those tied to physical input or output devices and thus logically located near that device. For example, spatially linked modules may be push buttons or solenoids or the like. Spatially independent elements have no direct connection to physical devices, e.g., elements such as timers or counters or filters.

The partitioning program first groups the spatially linked elements according to their locations as may be provided by the programmer. The spatially independent elements are then associated with one of these groups. The placement of the spatially independent elements can be done to minimize communications between control modules when the groups are downloaded to the control modules thereby improving link capacity.

More specifically, the invention provides a partitioning program for dividing a control program into portions to be executed by spatially separated control modules communicating via messages on a communication link. The control program reads inputs from physical devices and writes outputs to physical devices and is composed of logically interconnected, spatially linked elements representing inputs and outputs to physical devices and spatially independent elements not representing inputs and outputs to physical devices. The program executes on an electronic computer and includes a grouping routine assigning spatially linked elements of the control program to groups based on spatial proximity of the corresponding physical devices whose inputs and outputs are represented by the spatially linked elements. A first allocation program then allocates the spatially linked elements of the control program to the control modules according to their grouping. A second allocation program allocates spatially independent elements to ones of these groups.

Thus, it is one object of the invention to permit the centralized development of a control program that will be executed on a highly distributed system. By separating the elements of the control program into spatially linked and spatially independent elements, the program may then be efficiently partitioned by the groups.

The second allocation program may allocate the spatially independent elements to one of the groups so as to minimize the transmission of messages between control modules after the control program has been downloaded. In this regard the second allocation program may determine the number of interconnections between groupings and may examine the expected frequency with which messages will be transmitted to and from a given spatially independent element.

Thus, it is another object of the invention to provide a simple rule that may be executed on an electronic computer to automatically and efficiently partition a control program for use in a highly distributed environment. Allocating the spatially independent elements of the control program to minimize link messages increases the reserve capacity of the link or conversely allow a less expensive, lower bandwidth link to be used.

The partitioning program may also include an optimizer routine changing the logical connections between the spatially independent elements and the spatially linked elements prior to the operation of the second allocation program.

Thus, it is another object of the invention to optimize existing control programs for improved partitioning among highly distributed control modules.

The grouping routine may assign the spatially linked elements of the control program to groups based on spatial proximity and by reviewing a catalog table of available control module types combining different physical devices. The catalog table may have an estimated cost of the available control module and an estimated cost of integrating the control module into the distributed control (HDC) network.

Thus, it is another object of the invention to provide tools to assist the programmer in breaking a centrally developed control program up to run on separate highly distributed control modules.

Each control module may have predetermined processing resources, such as processor speed or memory, and the second allocation program may allocate the spatially independent elements to control modules if they have sufficient processing resources to match the processing resources needed by the spatially independent elements and otherwise the second allocation program may allocate the spatially independent elements to control modules without interface to physical devices but with enhanced processing resources.

Thus, it is another object of the invention to ensure that the partitioning of the control program distributes the program elements to control modules having sufficient resources and to admit the use of control modules having no function but the execution of spatially independent control elements.

The foregoing and other objects and advantages of the invention will appear from the following description. In this description, reference is made to the accompanying drawings which form a part hereof and in which there is shown by way of illustration, a preferred embodiment of the invention. Such embodiment does not necessarily represent the full scope of the invention, however, and reference must be made therefore to the claims for interpreting the scope of the invention.

BRIEF DESCRIPTION OF THE DRAWINGS

FIG. 3 is a computer display of a centrally developed control program represented in relay ladder language suitable for use with the process of FIG. 1;

FIG. 4 is a physical view of the control modules ultimately used to implement the control program of FIG. 3 in highly distributed form according to the partitioning program of the present invention;

FIG. 11 is a chart of a database of supplemental information about the elements of the control program of FIG. 3 used in the present invention;

FIG. 12 is a chart of a database of information about the control modules that may be interconnected as shown in FIG. 4 as used in the present invention.

DETAILED DESCRIPTION OF THE PREFERRED EMBODIMENT

Figures 9, 13:
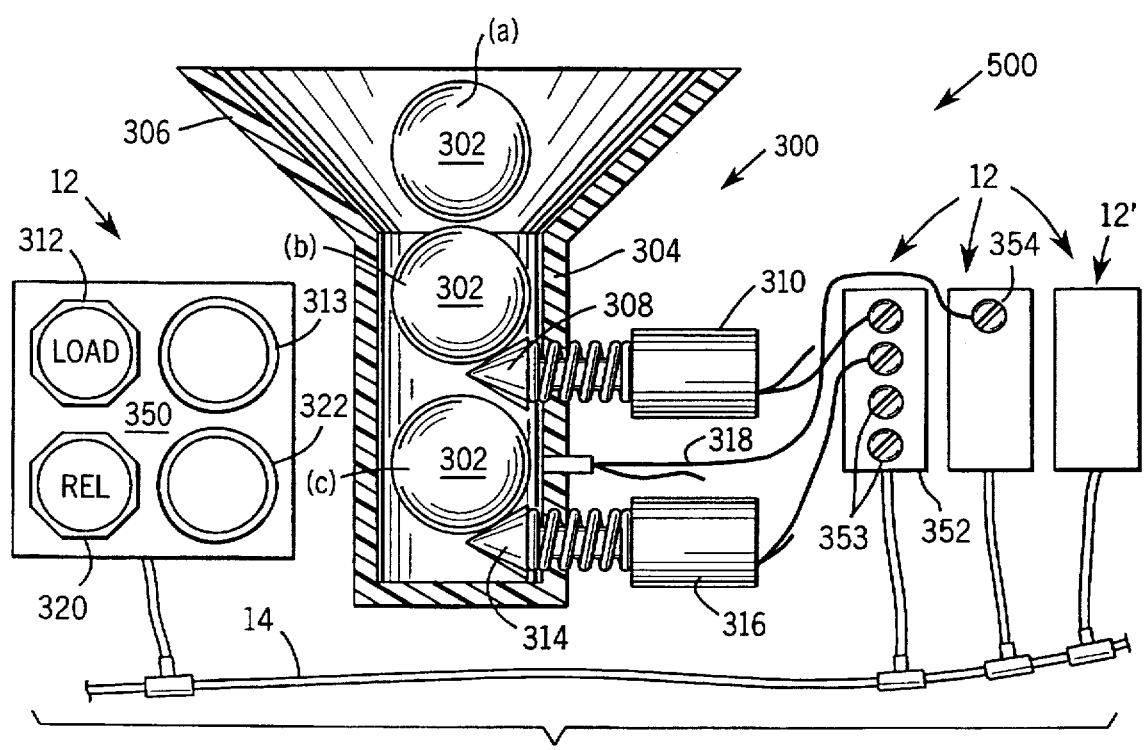
FIG. 9 is a catalog table used in the present invention to provide the groupings as shown in FIGS. 5 through 8.
FIG. 13 is a figure similar to FIG. 1 showing a completed control system.

Referring momentarily to FIG. 13, the present invention provides a software tool for the development of a highly distributed control system in which a controlled process 300 is controlled with input and output signals provided by a number of distributed control modules 12. Generally each control module 12 is connected to a common communication link 14 and has its own microprocessor and memory and may execute a portion of a centrally developed control program downloaded to that memory from a central programming terminal attached to link 14 and then removed.

The present invention provides a method of breaking a centrally developed control program into pieces that may be downloaded to these various control modules 12 together with the necessary interconnection information allowing the control modules to coordinate their actions.

Insofar as there may be more than one division of a control program into pieces that may run on the modules 12, a method of optimizing this partitioning process is described. The grouping of particular elements of a control program into a link also depends on the particular link available and hence a method is also provided of selecting among arbitrary commercially available modules in optimizing an HDC system. A description of the hardware of the modules 12 and the link 14 is found in U.S. Pat. No. 5,452,201 issued Sep. 19, 1995, assigned to the same assignee as the present invention and hereby incorporated by reference.

Figure 1:
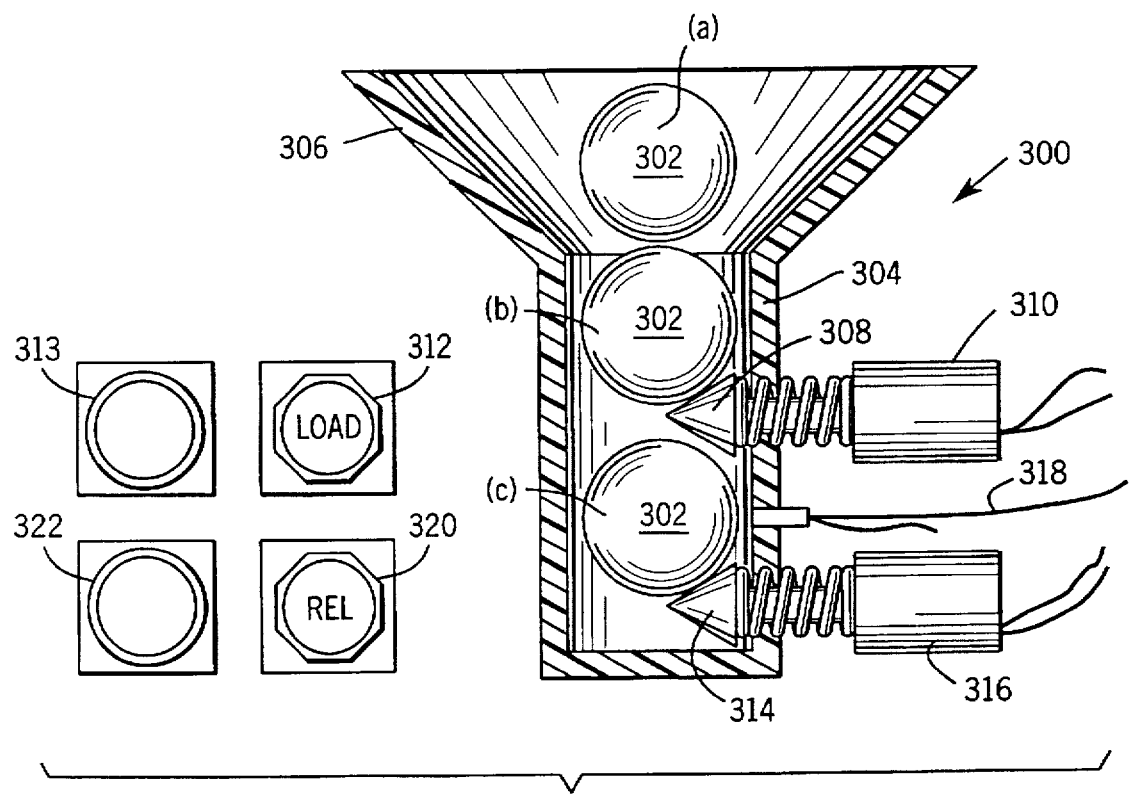
FIG. 1 is an elevational view of physical devices making up a simple process for staging and releasing balls such as may employ a highly distributed control system.

Referring now to FIG. 1, a simple process 300 suitable for use with a highly distributed control system 500 (shown in FIG. 13) may control the release of balls 302 through a tube 304.

In the process 300, a large supply of balls 302 is held within a hopper 306 which funnels them into the upper opening of tube 304. The funneling permits the entry of a single ball 302 from position (a). The ball 302 is then stopped in the tube 304 at position (b) by a pawl 308 attached to a solenoid 310.

Solenoid 310 may be activated by a pressing of load push button 312 whereupon it retracts pawl 308 permitting ball 302 to drop to position (c) where it is stopped by pawl 314 attached to solenoid 316. At position (c), ball 302 is sensed by proximity switch 318.

Upon a pressing of release push button 320, solenoid 316 is activated retracting pawl 314 and allowing ball 302 to drop out of tube 304. At the time of activation of the load push button 312, a lamp 313 may light and similarly at the activation of push button 320 lamp 322 may light.

After a predetermined number of balls 302 has dropped from tube 304, the solenoid 310 is deactivated so no further balls are loaded.

Figures 3, 4:
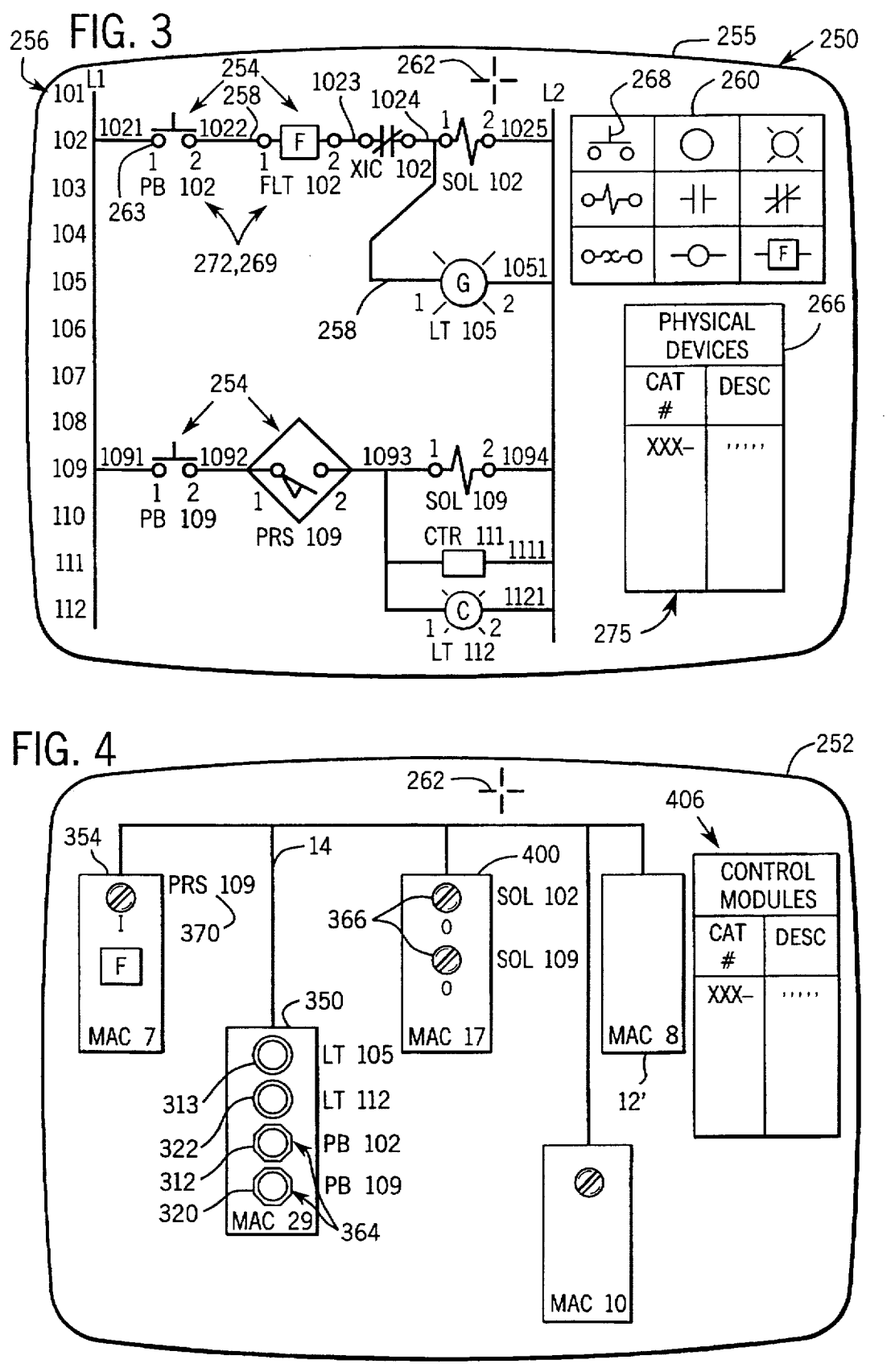

Referring now to FIGS. 1 and 3, a programmer preparing a highly distributed control system for the process 300 first prepares a control program 250. The control program 250 is represented graphically on a computer display 255 according to conventional relay ladder language conventions and may be produced on a commercial CAD package such as AutoCAD, a well known commercial CAD (computer aided design) package produced by AutoDesk, Inc. of Sausalito, Calif. Such CAD packages operate on standard PC (personal computer) type computers and are intended for the production of engineering drawings for the design of various products and produce data files representing the graphical structure of the drawing produced on the computer's electronic display. A data file produced by such CAD programs and providing a machine readable representation of the control program 250 will be described below.

According to standard electrical practice, the control program 250 includes line numbers 256 displayed on the left side, in this case forming a vertical margin of numbers 101 through 112. A left vertically running line is positioned just inside the numbers 256. A right vertically running line provides a right margin to the control program 250. These lines, designated L1 and L2, represent electrical power rails which provide a virtual source and sink of current carried on "wires" 258 (shown as lines on the display screen 255).

The physical elements 254 of the process 300 of FIG. 1 are represented in schematic form by JIC type icons connected between the lines L1 and L2 just as if they were physical devices electrically connected to power. Thus, a program element 254 labeled PB102 (representing push-button 312 of FIG. 1) has a first terminal "1" connected to the first power rail L1. The second terminal "2" of PB102 is in turn connected to a first terminal "1" of program element FLT102 immediately to its right. FLT102 is a filter which serves in this case to prevent extremely short activations of PB102 from triggering the remainder of the circuit.

The second terminal "2" of program element FLT102 connects to a normally closed contact XIC102 that is controlled by the counter CTR111 to be described. Contact XIC102 serves to disable the rest of the circuit after a certain number of balls 302 have dropped.

The remaining terminal of the contract XIC102 connects both to program element SOL102 (representing solenoid 310 in FIG. 1) and LT105 (representing lamp 313 in FIG. 1) both wired in parallel and having their second terminals connected to the second power rail L2 extending vertically down the left of the schematic forming the control program 250.

Program element PB320 (representing push-button 320 in FIG. 1) also connects at one terminal to the power rail L1. Its second terminal connects to a first terminal of PRS109 (corresponding to proximity switch 318 in FIG. 1). The output of PRS109, the latter which is normally open, is connected to one terminal each of SOL102 (representing solenoid 316 in FIG. 1). CTR111 being the counter referred to above and LT112 (representing lamp 322 in FIG. 1). The counter CTR111 counts each activation of the solenoid SOL102 and after a predetermined number is reached opens contacts XIC102.

The programmer constructs the logical diagram of the control program 250 by selecting program elements 254 from a menu and "wiring" their terminals together using standard CAD techniques. The program elements 254 may be selected from a program element menu 260 to the right of the display screen 255 which includes pictures of standard electrical schematic symbols well known in the art. The particular program elements 254 may be selected by the operator by movement of a cursor 262 on the display screen 255 by means of a cursor control device such as a mouse or trackball. The cursor 262 is positioned over the appropriate symbol of the program element menu 260 which is then "dragged" to an appropriate position on the screen. A drawing tool may then be invoked to connect the various discrete program elements 254 together at their terminals 264 represented by small circles.

Each program element 254 is provided with an alphanumeric caption 272 displayed beneath the program element 254 providing a unique program element name 269 for the elemental function represented by that program element 254. For example, the unique program element name 269 for the program element PB102 referred to above is simply "PB102". The unique program element name 269 is used by the CAD program to associate various qualities of the elemental function to the program element 254, and is generated automatically by the CAD system.

As depicted, the unique program element name 269 follows standard schematic practice, the first alphanumeric portion of the caption is an abbreviation of the device type. Hence, push-buttons employ the letters PB, proximity switches employ the letters PRS, solenoids the letters SOL, lights the letters LT and filters FLT. The numeric portion of the caption following the alphanumeric portion is the line number of the device on the schematic taken from the line numbers 256. Terminals 263 of the discrete program element 254 are also numbered and a page number for the particular page of the control program 250 may be added for schematics that extend over multiple pages. This unique program element name 269 is then linked to a catalog type by an internal file (not shown) to provide additional information for each elemental function represented by a program element 254. The power rails L1 and L2 are also represented as icons (vertical straight lines), however, they are automatically positioned on the display screen without operator intervention, and do not need further identification.

Wires 258 are also labeled with numbers related to their line numbers and their order in a line from left to right. Hence the first wire 258 at line 102 attached to L1 is numbered 1021, the next wire 258 in that line is numbered 1022 and so forth.

As each program element 254 is selected from the program element menu 260, a physical device menu 266 appears also to the right of the display screen 255 listing physical devices of that general class and providing specific catalog numbers for commercial products that are within the general class of the icon selected. In this case, the commercial products represent discrete components that work with real wire rather than the virtual components that may be implemented in the highly distributed control system of the present invention. For example, if a push-button switch icon 268 is selected, the physical device menu 266 will provide catalog numbers for various types of mechanical push-button switches having physical screw terminals. These push-buttons may be normally open, normally closed and may have one or more sets of gang contacts depending on the choice of the designer.

Thus, each discrete program element 254 has associated with it, a catalog number for a specific device that uniquely identifies how the device operates. This information will be used for programming the module that emulates these devices. For many catalog numbers, the same program element 254 will be displayed upon the display screen 255.

Referring to FIG. 11, additional information about each discrete program element 154 is linked to the unique program element name 269 for that program element 254. This additional information is provided by a second data list 267 (not visible to the programmer) cross referencing device catalog numbers 277 and unique program element name 269 of the program elements to other data about the represented program element.

In this data list 267, a pair of columns 271 provides information about the icon used to represent the elemental function including the number of input and output terminals that may accept wires. A column 270 provides a pointer identifying a program subroutine that may be used to emulate the elemental function represented by the unique program element name 269. For example, the operation of a push-button switch in normally open or normally closed states will have one of two implementing programs that may be loaded into a module to emulate the push-button.

Data list 267 also indicates a class 273 of the elemental function broadly characterizing those elemental functions that require special hardware like push-button operators or lamps. All push-button switches requiring a physical push-button operator will be of a single class, in this case class A. The filter FLT102 which requires extensive arithmetic capabilities is indicated to be a class B and thus not suitable for modules which do not have extensive arithmetic capabilities. The proximity switch PRS109 is of class C indicating that separate specialized hardware is required.

Closely analogous to the class 273 is a demand characteristic 274 which indicates an estimate of the burden the program element 254 will place on the implementing processor of the emulating module and in the preferred embodiment is a composite figure reflecting the speed of the processor and the amount of electronic memory in the control module. In this case, push-button switches which have relatively simple logic and require little processor speed or memory, have a low demand of ten whereas the filter which requires additional processor time and memory shows a demand of 110. Demand generally indicates how demanding the emulation is of hardware.

A final column of data 276 indicates whether external connection is required for the program element. The connections may be either inputs or outputs from or to the controlled process or an operator such a push-button operator. Generally, such external connections cause the element to be classified as "spatially linked", a classification that will be employed in partitioning the control program among the control 1 modules. A control program element 254 that has no external connection is "spatially independent". Push-button PB102 is a "spatially linked" element of the control program 250, that is it represents input from a physical button 312 which must be located at a particular place. Conversely, filter FLT102 is a spatially independent element of the control program 250, as are XIC 102 and CTR111, in that they do not connect directly to any physical device and therefore cannot be said to have a particular physical location.

Figure 10:
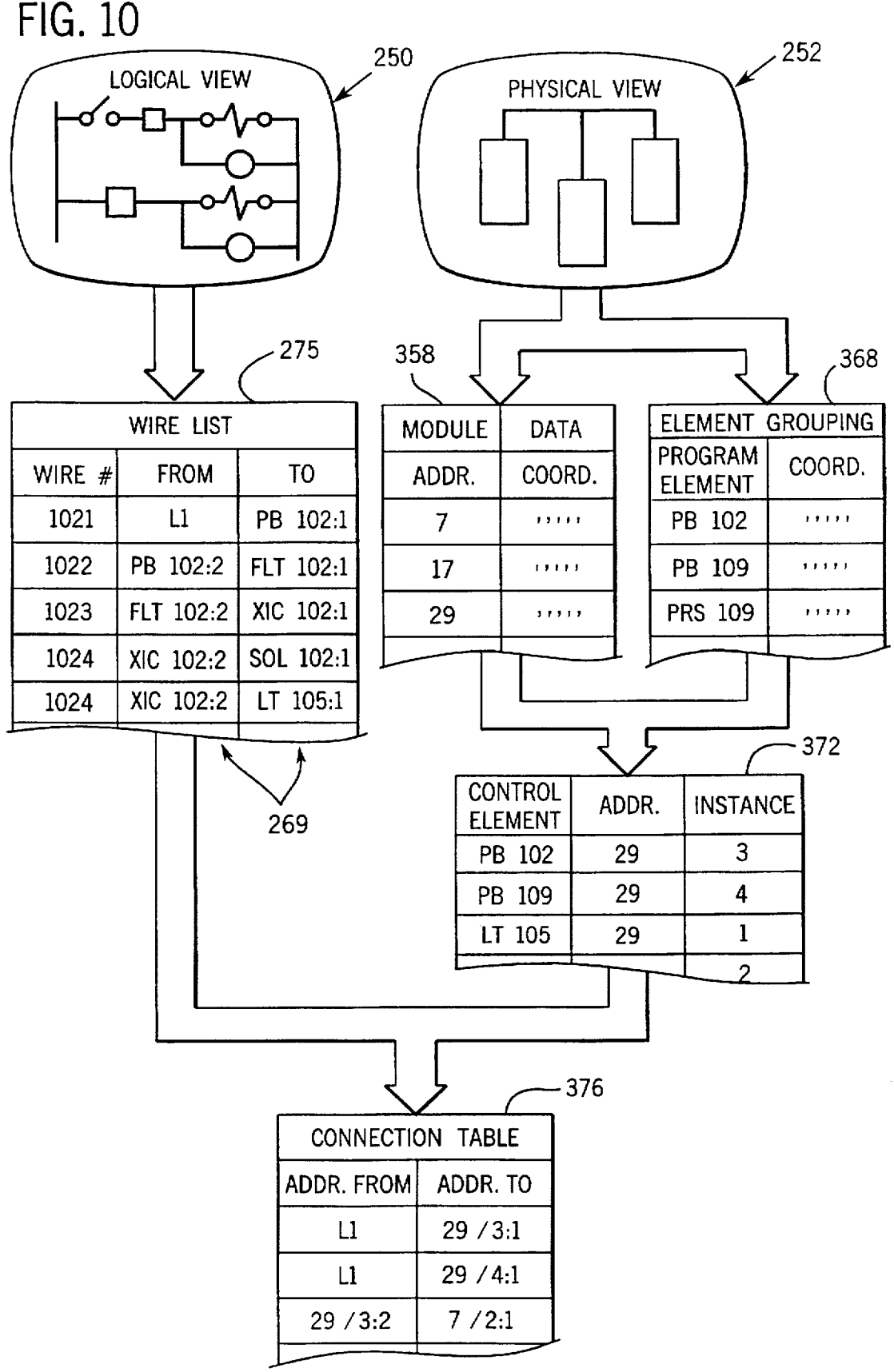
FIG. 10 is a flow chart showing the compiling of the logical view of FIG. 3 and the grouped physical view of FIG. 4 into data tables which may be loaded into the control modules for a distributed execution of the control program.

Referring now to FIGS. 3 and 10, the CAD program saves the data of the control program 250 not as a bit map of the image of the schematic of the control program 250 as it appears on the display screen 255, but rather in the form of a wire list 275 relating wire numbers to source and destination program elements 254 described by their unique program element name 269 and terminal numbers as described above. The wire list 275 provides three columns of data: a unique wire number and unique program element name 269 for two interconnected program elements 254. The unique program element name 269 are augmented in this case by a terminal number separated from the unique program element name 269 by a colon. Hence PB102:1 is the first terminal of the program element 254 associated with program element PB102. In other words, each row of the wire list 275 identifies pairwise connections between discrete program elements 254 and the wire making the connection. Multiple rows serve to record circuit branches.

Thus, for example, the PB102 of FIG. 12, being connected directly to the left power rail L1 by wire 1021, provides a first row in the wire list 275 as wire number 1021, from L1, to PB102:1. Likewise, where PB102 is next connected to FLT103, the next entry in the wire list will be wire number: 1022 from PB102:2, to FLT103:1 indicating that current may then pass from the second terminal of PB102 to the first terminal of the FLT102.

The wire list 275 thereby provides a distillation of control program 250 indicating wires and the terminals and discrete program elements 254 to which they connect. The essential information of the wire list is produced as a file from commercially available software tools such as the PROMIS-E automatic documentation system manufactured by ECT, Inc. of Brookfield, Wis. which runs as an application inside the AutoCAD program manufactured by AutoDesk, Inc.

The wire list 275 together with the supplemental data list 267 fully defines the logical structure of the industrial controller through the interconnections of particular discrete program elements 254 with wires 258 and by the operation of the program elements represented by the program elements 254 each which reflects the operation of a simple electrical component.

Figure 2:
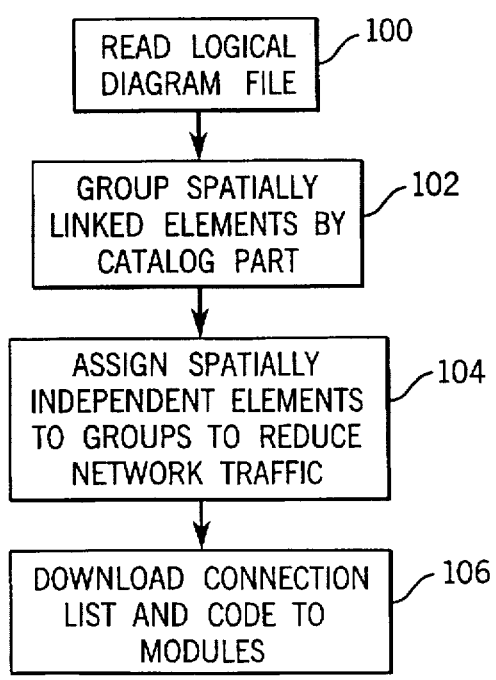
FIG. 2 is a flow chart of the steps of partitioning a centrally developed control program for the process of FIG. 1.

Referring now to FIGS. 2 and 3, after the control program 250 is created, the partitioning program of the present invention reads in the control program 250 in the form of the wire list 275 and the data list 267 as indicated at process block 100.

Next at process block 102 the spatially linked program elements (e.g. PB102, PRS 109, SOL 109 etc.) are grouped for the purpose of a partitioning of the program into various modules. The spatially linked elements are those elements having external connections indicated by column 276 of data list 267.

Those spatially linked elements are grouped together according to the proximity of their associated physical devices to each other. Thus PB102, PB109, LT105 and LT112 are grouped together because it is convenient for all these components to be near one another in the particular process. The spatial proximity of the physical devices associated with each program element 254 is not indicated anywhere in the control program 250 and this information must be solicited from the programmer. This may be done, for example, by having the programmer draw a line around elements that should be kept together. Alternatively, a grouping code may be assigned to the elements, elements with the same code being grouped together.

In the process depicted in FIG. 1, the programmer may, for example, indicate that push buttons 312 and 320 and lamps 313 and 322 all of which are spatially linked should be grouped together for example in a single control pendant. Likewise solenoids 310 and 316 and proximity switch 318 may be also grouped as a result of their position on the tube 304.

As each group is proposed by the programmer, the proposed groupings are checked against a catalog file 400 shown in FIG. 9. The catalog file 400 lists in a first column 402 a single program element 254 such as a push button limit switch or proximity switch identified by catalog numbers per physical device menu 266. In a second column 404 other spatially linked elements that may be implemented in a single control module with the element of column 402 are listed. Thus each row of the catalog file 400 describes a commercially available control module that can be purchased to emulate all the physical elements of that row.

Some physical devices, such as a solenoid, may have no particular product associated with them but may use a general purpose terminal block to which multiple devices may be wired. These additional devices are indicated by X's in column 404 and by a null character in the catalog file 400.

For each proposed grouping of the elements of the control program 250, the catalog file 400 is reviewed to see if a single control module will support the grouping. If not, the programmer is so informed and a different grouping must be adopted. Each row of catalog file 400 also provides a catalog number for the control module necessary to perform that grouping so that a parts list may be created for the programmer. Note that this catalog number 406 is for the control module as distinct from the catalog number of physical device menu 266 of FIG. 3.

Each row of the catalog file 400 also includes two expected costs: the first indicating a relative purchase price 408 of the control module selected so as to provide a costing estimate and to allow selection between two links that are equally able to perform the desired grouping. The estimated installation cost 410, reflects the installation effort needed to incorporate the control module into the system and is intended to guide the user to a control module that requires less installation effort. Generally the purchase price cost in purchase price 408 increases with the number of functions supported by the control module, whereas the installation cost 410 increases with the complexity of the installation. Thus a terminal block which may be used for many implementations has the greatest installation costs.

Ultimately when a grouping has been selected these costs may be printed out to provide a cost estimate for the programmer.

Spatially independent elements of the control program are not listed in catalog file 400 as they have no associated physical devices.

Referring to FIG. 3, as described above, in an initial grouping, push buttons PB102 and PB109 and lights LT105 and LT112 (which are spatially linked as indicated by data list 267) and are proximate according to the design proposed in FIG. 1, are grouped together. Solenoids SOL102, SOL109 and proximity switch PRS109 are also proximate and spatially linked; however, a grouping fails because the catalog file 400 in this example indicates that there is no control module that will support all three of these devices and hence the solenoids are grouped together and the proximity switch is grouped separately.

At the conclusion of process block 102, groupings will be established and modules will have been identified by catalog numbers from catalog file 400. Referring to FIG. 12, a new file 360 is then created listing the modules to be used and their catalog numbers and assigning each of them a unique address that will be used on a link connecting the control modules to each other and that may serve as the group number for the next steps of the partitioning process. This data file 360 links each physical device (by its catalog number) to an assigned address (on the link) or group number to other data describing the module and obtained from a directory of modules identified by the catalog number 406 of table 411.

Figure 5:
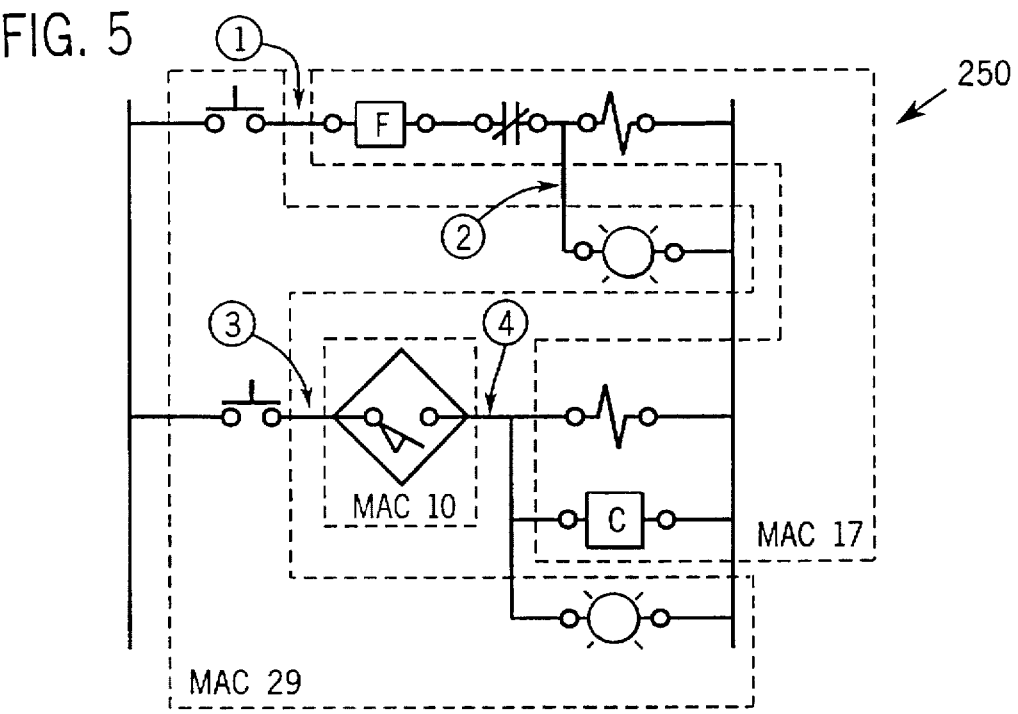
FIG. 5 is a simplified representation of the control program of FIG. 3 showing a first grouping of the control elements such as requires four points of interconnection between spatially separated control modules.

Referring now to FIGS. 2 and 5 at process block 104 the spatially independent elements are next placed in the various groups that have been previously identified for the spatially linked elements at process block 102. Typically there will be a number of different possible groupings One such grouping is shown in FIG. 5 where all of the spatially independent elements are placed in the same group as that of the solenoids, meaning that the control module attached to the solenoids would also have responsibility for implementing the functions of the filter and counter. Counter CTR111 and its contact XIC102 are constrained to be in the same grouping because they are the same device.

In process block 104, each combination is tried and the capabilities of the control module that will be associated with each spatially independent elements is examined by looking at a file 360. Generally the sum of the demands 274 of data list 267 for each program element 254 must summed, be less than the capacity of the control module indicated by column 285 of file 360.

In this case the proposed grouping of FIG. 5 requires that the group assigned to the address 17 be allocated the filter FLT 102, the counter CTR 111 and two solenoids SOL 102 and SOL 109. Thus the demand for these elements would be summed and compared to the capacity of the control module selected. In FIG. 5 the address is preceded by the letters "MAC" (media access layer) to distinguish the addresses from other numbered elements. If the control module does not have a sufficient capacity a new grouping is proposed or another module is selected possibly having a higher expected purchase price 408 or expected cost 410 from catalog file 400.

Referring still to FIG. 5, in the proposed grouping, if the program elements of each grouping were loaded into separate modules there would be four connections between different modules which would require messages transmitted on the link between modules. This number is recorded and additional combinations of the spatially independent elements with the various groupings are tried to see if fewer connections between groupings can be obtained.

Figure 6:
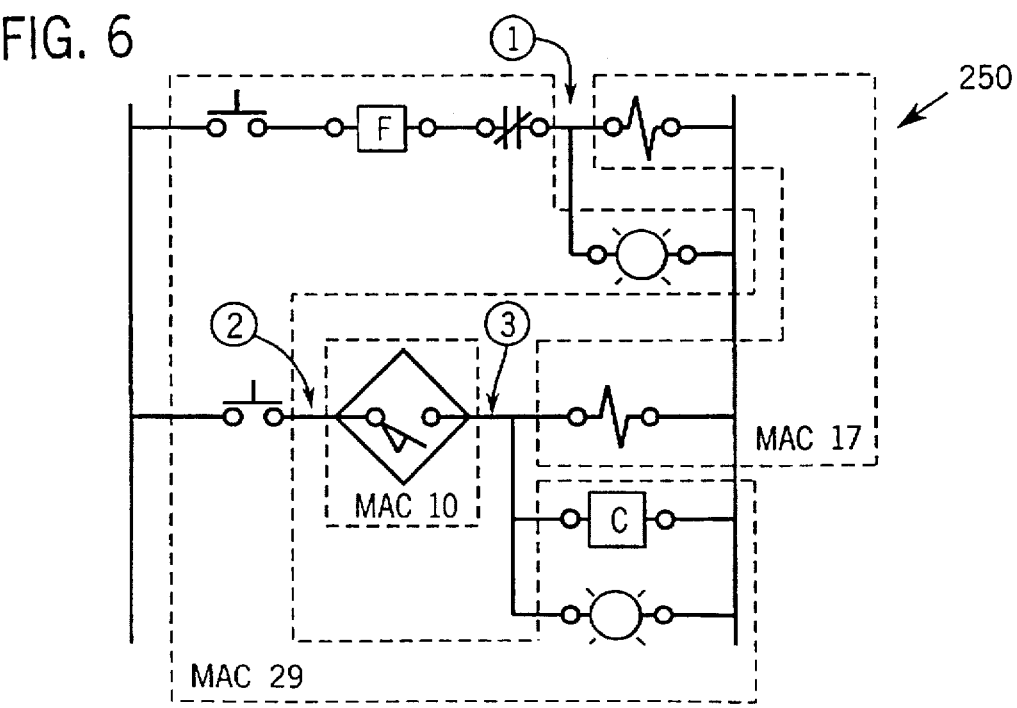
FIG. 6 is a figure similar to that of FIG. 5 showing a second grouping requiring only three points of interconnection between different control modules.

Referring to FIG. 6, in a second grouping in which the filter FLT 102 and counter CTR 111 are placed in the same grouping as the push buttons PB102 and PB109, associated with the control module with address 29, only three connections between modules are required. If this grouping meets the requirements that a control module exists that will support the grouping it is to be preferred over the grouping of FIG. 5. This approach recognizes that messages between elements within a module need not be transmitted onto the link 14 and thus do not adversely affect link traffic.

The goal of reducing the connections between different control modules 12 as reflected in the groupings of FIGS. 5 and 6 may be refined if the programmer enters or assigns bandwidth to the messages that will pass connections between modules. The bandwidth roughly provides a gauge of the expected frequency of the messages along the connection, or how much information is to be transmitted and may be used to weight the connection numbers to provide a better indication of how much link traffic will be placed on the link 14. Thus in some circumstances four low bandwidth connections between modules that do not appreciably tax the capacity of the link 14 will be preferred to three connections where the connections require the transmission of great amounts of data.

Bandwidths may be deduced to some extent from the program elements themselves. For example, the input to the counter CTR 111 will generally have a higher bandwidth than the output of the counter, the output of the counter only changing after the full count has been accumulated.

Bandwidth considerations being equal, the grouping that provides the least number of connections between different control modules 12 is selected at process block 106. In this grouping process it is assumed that the messaging structure for sending messages on link 14 allows the broadcast of a single message from one control module 12 to many control modules on the link. Thus, in the grouping of FIG. 6, the output of the proximity switch PRS 109 at address 10 may simultaneously be broadcast to the solenoid contained at address 17 and to the counter CTR 111 and lamp LT 112 at address 29 and thus counts for only one connection. Generally more connections promote more link traffic and either overtax the common link 14 or more realistically require a higher band width link, for example, moving from twisted pair to coaxial cable at correspondingly greater cost and installation labor.

Figure 7:
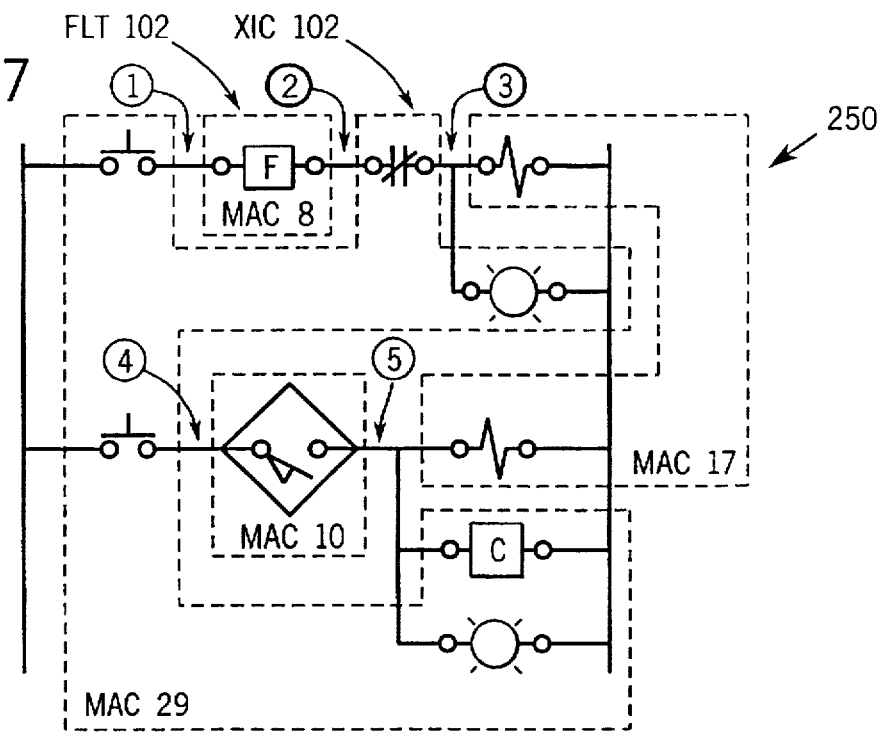
FIG. 7 is a figure similar to that of FIG. 5 showing a different grouping required because a filter control element requires a separate control module, the grouping of FIG. 7 having five points of interconnection between control modules.

Referring now to FIG. 7, in some circumstances a particular spatially independent program element 254, in this case the filter FLT102, may require disproportionate processing power or memory, i.e. beyond that which is cost effective in a typical control module 12. It will be assumed for the purpose of FIG. 7, that FLT102 has a demand of 1,000 instead of the 110 indicated in data list 267. Such a high demand may represent the use of a sophisticated processing algorithm, for example, one requiring a long term accumulation of previous data or extensive calculations. In this case, during the grouping process of process block 104 of FIG. 2, the filter receives an independent group given a new address of 8.

Referring to FIG. 4, for program elements 254 having extremely high processing demands in speed or memory, it is contemplated that special control modules 12' having no direct interface to the control process be utilized. These modules, that may be referred to a spatially independent control modules 12' may be placed anywhere on the link 14 to provide processing capability to the distributed control system. The grouping process of process block 104 of FIG. 2 would assign the filter FLT 102 to this spatially independent module 12'.

In this case, where FLT 102 is put in its own group, the grouping of FIG. 6 sees an increase from three to five in the number of connections between control modules 12 when the groupings are downloaded to the modules. This number of connections may be reduced by a restructuring of the control program from 250 to 250' shown in FIG. 8 in which the order of FLT102 and XIC102 are changed. This changing of the order does not affect the logic of the control program 250' because series elements are logically ANDed together and the logical AND process is commutative. Yet, as may be seen in FIG. 8, the switching of these elements allows a grouping that reduces the number of intermodule connections from five (of FIG. 7) to four (of FIG. 8). Thus process block 104 of FIG. 2 also examines permutations of the control program elements in series connection such as may reduce the number of connections or connections as weighted by band width numbers.

This optimization of the control program 250 may also swap the order of elements in parallel rows which represents logical ORs reflecting the commutative property of logical ORs as well.

It will be understood to those of ordinary skill in the art from this description that ladder logic program is particularly sensitive to such optimization because the interconnection of the elements carries with it some of the control logic. In alternate control languages also suitable for highly distributed control, such as function block languages where logical AND-ing and OR-ing is represented by discrete functional blocks, less optimization is required.

Figure 8:
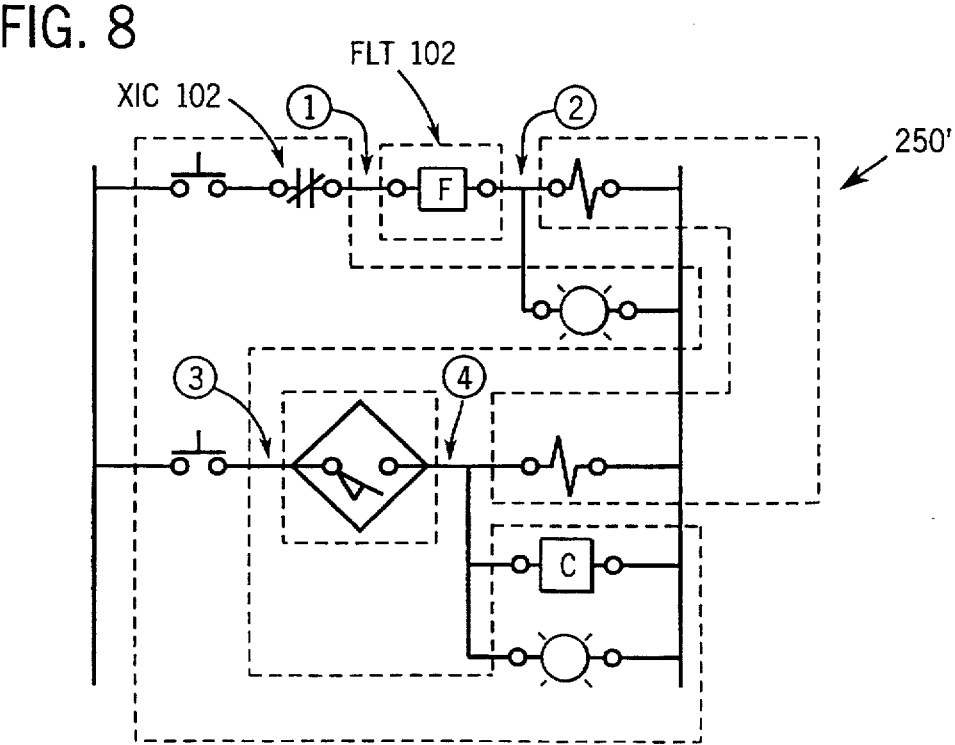
FIG. 8 is a figure similar to that of FIG. 7 showing a reordering of the control program of FIG. 3 reducing the number of interconnections between control modules to four.

Once the grouping of FIG. 8 or FIG. 6 is arrived, at a physical view 252 is developed as shown in FIG. 4. This view describes the physical appearance of the distributed control system. The physical view 252, like the control program 250, is displayed on the computer display 255 and described by files stored in the computer: in particular files 358 and 368 as shown in FIG. 10. The module data file 358 links addresses on the communications link 14 (a MAC address) associated with a given module to the spatial screen coordinates of the outline representing that module. Similarly, the device data file 368 links the unique program element name 269 of the elemental functions to the screen coordinates of their physical symbols. This data together with an identification of the physical icon 364 used to represent the elemental function of the unique program element name 269 (provided by data list 267) is sufficient to reconstruct the physical diagram and thus incorporates its essential information.

The module data file 358 indicates the grouping selected in either FIG. 6 or FIG. 8 by associating each program element 254 with the coordinates of its module. This information is combined by means of the common screen coordinate data to produce a linkage table 372 in which each row provides the name of the program element 254, its address on the link 14 (that is the address of its control module) and an instance number being a subaddress within the address of the module used to identify that particular program element. Thus for example, according to the physical view 252 push button PB102 is in the control module at address 29 and is instance 3 the third program element 254 in that control module 12. Messages connected to address 29 instance 3 will be received by the software emulating push button PB102.

Table 372 is generated by combining files 358 and 368 and is used to program the various modules 12 by sorting through the modules by address identifying those program elements that will be emulated by that module and looking up the emulating code in data list 267 for downloading to that module 12. This downloading is indicated by process block 106 of FIG. 2. In general the emulating code is quite simple. For a push button, the program simply reads messages indicating that it has "received" current from another function and transmits messages indicating "current" at its output if the push button is closed, and otherwise indicates no current is present at its output.

Next the virtual wiring between the program elements must be established per the control program 250, i.e. the connections between the modules by the common communication link 14. This virtual wiring requires that each element identify the address of the outputs of other elements to which it is connected and it produced by means of connection table 376 which provides a from and to address indicating a virtual connection between every output terminal of an program element 254 and every input terminal of a program element 254 to which it is connected. The connection table may be used to establish connected messaging well understood in the art and readily implemented with the CAN (controller area network) hardware described in the predecessor patent well known in the art and readily commercially available. One example of a CAN link controller suitable for connected messaging is 80C592 microcontroller preprogrammed for executing the CAN protocols commercially available from Signatecs Corporation having offices in Sunnyvale, Calif. The CAN specification defines the requirements which comprise the Media Access Control (MAC) and physical signaling layers of the ISO/OSI (International Standards Organization) for data communication links. The CAN protocols are specified in ISO document ISO/TC22/SC3/WG1 as authored by Robert Bosch GmbH, hereby incorporated by reference. Specifically, each program element 254 identified on the wire list 275 is linked to its address in instance from table 372 to create a composite address including the address of the control module 12 followed by the instance of the program element 254 within the module 12 followed by a terminal number of the program element. The number of terminals of the device is provided in the data list 267 of FIG. 11 and is part of the information predetermined by the catalog number of the device.

Thus, for example input terminal of push button PB102 has an address of 29/3:1 where 29 is the address of its control module 12, 3 is the instance number in the module (it is the third program element 254 implemented by that module) and 1 is the number of its terminal (it has two terminals) which is the input as shown on the control program 250. Then for example wire 1021 connecting device L1 (the supply rail) to the first terminal of push button PB102 shows a row on the connection table where the address from is L1 (a standard designation since L1 will always be in every control program 250) and a second column of that row for address 2 being 29/3:1.

Implementing the virtual connection between modules 12 may be performed by finding each module with an address two entry and loading that row of the connection table to that module to create a connection chart for that module allowing it to open connections between that module and other modules reflecting that wire. At the same time the necessary code fragments being portions of the control program 250 are loaded to the module 12.

The above description has been that of a preferred embodiment of the present invention. It will occur to those that practice the art that many modifications may be made without departing from the spirit and scope of the invention. For example, the partitioning method of the invention, driven as it is by the concern of reducing link traffic, may find use in a general multitasking environment where portions of a program can be allocated to different processors without regard to spatial linking. In order to apprise the public of the various embodiments that may fall within the scope of the invention, the following claims are made:

I claim:

1. A partitioning program for dividing a control program into portions to be executed by spatially separated devices communicating via messages on a communications link, the control program reading inputs from physical devices and writing outputs to physical devices, the control program composed of spatially linked elements representing inputs and outputs of physical devices, which are logically connected to spatially independent elements not representing inputs and outputs to physical devices, the program executing on an electronic computer and comprising:

a grouping routine assigning spatially linked elements of the control program to groups based on spatial proximity of the corresponding physical devices whose input and output are represented by the spatially linked elements;

a first allocation routine allocating the spatially linked elements of the control program to the devices according to their grouping; and a second allocation routine allocating the spatially independent elements to ones of the groups.

2. The partitioning program of claim 1 wherein the second allocation program allocates the spatially independent elements to ones of the groups so as to minimize messages on the link after the groups have been downloaded to devices by allocating a given spatially independent element to a group to minimize messages associated with logical connections between elements of different groups.

3. The partitioning program of claim 2 wherein the second allocation program receives an expected frequency of messages associated with logical connections between spatially linked and spatially independent elements and allocates a given spatially independent element to a group to minimize messages associated with logical connections between elements of different groups as weighted by the expected frequency of messages associated with the logical connections.

4. The partitioning program of claim 1 wherein the grouping routine may allocate only one spatially linked element to a group.

5. The partitioning program of claim 1 including in addition:

an optimizing routine receiving the control program prior to the operation of the second allocation routine and altering the logical connections between the spatially independent elements and the spatially linked elements to leave the operation of the control program unaffected but to further minimize messages associated with logical connections between elements of different groups.

6. The partitioning program of claim 1 wherein the grouping routine assigns spatially linked elements of the control program to groups based also on a catalog table of control module types indicating different physical devices in available devices and an expected cost of using the available devices.

7. The partitioning program of claim 6 wherein the grouping routine selects between different groupings of the spatially linked elements by minimizing the expected cost of using an available control module.

8. The partitioning program of claim 6 wherein the expected cost in the catalog table indicates an expected cost of the available control module and an estimated cost of using the available control module.

9. A partitioning program for dividing a control program into portions to be executed by spatially separated devices having processing resources and communication via messages in a communication link, the link including devices without interface to physical devices with enhanced processing resources, the devices communicating via messages on a communications link, the control program reading inputs from physical devices and writing outputs to physical devices, the control program composed of spatially linked elements representing inputs and outputs of physical devices, which are logically connected to spatially independent elements not representing inputs and outputs to physical devices, the program executing on an electronic computer and comprising:

a grouping routine assigning spatially linked elements of the control program to groups based also on a catalog table of control module types indicating different physical devices in available devices and a spatial proximity of the corresponding physical devices whose input and output are represented by the spatially linked elements;

a first allocation program allocating the spatially linked elements of the control program to the available devices according to their grouping;

a second allocation program receiving information indicating the processing resources needed by the spatially independent elements and allocating at the spatially independent elements to ones of the groups if the available control module associated with the group has sufficient processing resources to accept the spatially independent elements and otherwise assigning the spatially independent element to the devices without interface to physical devices but having enhanced processing resources.

10. The program of claim 9 wherein the predetermined processing resource is memory capacity.

11. The program of claim 9 wherein the predetermined processing resource is processor speed.

* * * * *